(12) United States Patent
Liang

(10) Patent No.: US 6,174,939 B1
(45) Date of Patent: Jan. 16, 2001

(54) STABILIZED BITUMINOUS COMPOSITION BASED ON POLYMER IN-SITU BLEND

(75) Inventor: Zhi-Zhong Liang, Richmond Hill (CA)

(73) Assignee: Polyphalt Inc., North York (CA)

( * ) Notice: Under 35 U.S.C. 154(b), the term of this patent shall be extended for 0 days.

(21) Appl. No.: 09/117,956

(22) PCT Filed: Feb. 14, 1997

(86) PCT No.: PCT/CA97/00102

§ 371 Date: May 7, 1999

§ 102(e) Date: May 7, 1999

(87) PCT Pub. No.: WO97/30121

PCT Pub. Date: Aug. 21, 1997

Related U.S. Application Data

(60) Provisional application No. 60/011,826, filed on Feb. 16, 1996.

(51) Int. Cl.[7] ....................................... C08L 95/00
(52) U.S. Cl. ................................. 524/59; 524/68
(58) Field of Search ........................... 524/59, 68

(56) References Cited

U.S. PATENT DOCUMENTS 5,280,064   1/1994   Hesp et al. ........................ 525/54.5

FOREIGN PATENT DOCUMENTS

| 0 146 163 | 6/1995 | (EP) . |
| 2 283 179 | 3/1976 | (FR) . |
| WO 93 07219 | 4/1993 | (WO) . |
| WO 94 22957 | 10/1994 | (WO) . |

*Primary Examiner*—Peter D. Mulcahy
(74) *Attorney, Agent, or Firm*—Sim & McBurney

(57) ABSTRACT

Normally incompatible styrenic polymers are stably incorporated into bitumen by using an elastomeric triblock copolymer comprising polystyrene segments which is solubilized or compatibilized in the bituminous phase. The elastomeric triblock copolymer incorporated into the continuous bituminous phase provides polystyrene domains which are dispersed throughout the bitumen or a receiving unit which stabilize the particulate polystyrene against separation from the bitumen.

10 Claims, No Drawings

US 6,174,939 B1

STABILIZED BITUMINOUS COMPOSITION BASED ON POLYMER IN-SITU BLEND

This application claims benefit of Provisional application Ser. No. 60/011,826, filed Feb. 16, 1996.

FIELD OF INVENTION

The present invention is related to a process of combining polystyrene (PS) or PS-based plastics with an elastomer or rubber as a dispersion agent to form a novel stabilized bituminous composition, which comprises:

a) bitumen,
b) a PS-based plastic (PS homopolymer or PS blend or graft copolymer) which is itself not compatible with bitumen, and
c) an elastomeric triblock copolymer containing styrene which is compatible with bitumen.

The principles embodied in such composition are applicable to other polymers which are compatible in the molten state with polystyrene, as described herein.

BACKGROUND OF THE INVENTION

PS or PS based plastics are among the most commonly used thermoplastic polymers and generate a considerable amount of recoverable scrap material. Like other polymeric materials, such as polyethylene (PE), polypropylene (PP) and ethylene-vinyl acetate (EVA), due to their high stiffness over a range of service temperatures, PS would also seem very suitable for addition to bitumen and could thereby contribute effectively to the stiffness and strength of bitumen. Unfortunately, PS has problems similar to those of other polymeric materials, in that it does not significantly increase the elasticity of the asphalt binder and blends or dispersions with a range of different type of bitumens demix quite rapidly during hot storage. In addition, PS has been found to be very difficult to disperse into bitumen even using high shear, because of its intrinsic structural features of rigid molecular chains with high melt strength. Although it is economically attractive to consider PS based scrap thermoplastics as a modifier for asphalt, the above discussed obstacles have limited such an application.

The use of polymers (plastics or rubbers), whether singly or in combination, as asphalt modifiers has been known in the construction industry for many years. Many of these applications have received varying degrees of success in bituminous modification. The degree of success for each product is mainly dependent on the ease of processing, on the compatibility of the polymer with bitumen and on the final property of the bituminous composition. These prior art applications have provided the skilled technologist with many means for modifying bitumen properties, namely:

(a) by taking advantage of the plastics, such as PE, PP and their copolymers, with their crystallinity and their ease of mixing, to gain the stiffness and strength of bitumen;
(b) by using different synthetic elastomers, such as polyurethane, neoprene, NBR, EPDM and styrenic block copolymers (such as SBS, SIS, SB and SEBS), to improve the elastic recovery and viscosity of bitumen at high service temperature and the flexibility at low service temperature by selecting polymers compatible with bitumen according to its chemical composition;
(c) by adding different types of process oil and/or treating the binder with inorganic acids to improve the compatibility of polymer to bitumen;
(d) by using different crosslinking agents to vulcanize rubbers (mostly butadiene-based copolymers) into bitumen to build up chemical interaction and to obtain miscible rubberized bitumen; and
(e) by tailoring PE copolymers (such as EVA) through controlling the proportion of polymer components such as vinyl acetate (VA) in Eva, which enhance their compatibility and performance as bitumen modifiers.

Furthermore, the prior art (U.S. Pat. Nos. 5,280,064 and 5,494,966, and assigned to the assignee hereof) also disclosed a reactive process of in-situ producing a copolymer highly miscible with bitumen from incompatible plastics (using PE of high MW) and compatibilized rubber components. The situ-prepared elastomer reagent was found to function as stabilizer for both PE based plastics and butadiene based elastomers when used alone or together as bituminous modifiers (WO 94/22957, assigned to the assignee hereof).

Although there are other types of polymers described in the prior art as modifiers for bituminous application, two types of polymers, namely PE and its copolymers (as a representative of the plastics field) and styrenic-diene copolymers (as a representative of the rubber field) still remain the most useful as modifiers in the asphalt industry, but only when they are stabilized or compatibilized in bitumen using technologies described elsewhere.

Polystyrene (PS) plastics represents a line of rigid polystyrene based products from crystal homopolymer, toughened graft copolymers, to blends or alloys with various rubbers. The rigidity and high melt strength of PS plastics causes them to be very difficult to disperse into hot liquid bitumen. The coarsely dispersed phase produced under high shear force separates quickly once agitation stops. Of all the prior art related to the use of plastics as bitumen modifiers, the inventor knows of none involving the use of any types of polystyrene rigid plastics for such purpose.

Of the prior art related to elastomeric modifiers, many have disclosed the application of styrenic block copolymers, commonly called thermoplastic rubbers (TR), which are produced by a sequential chemical operation of successive polymerisations of styrene-butadiene-styrene (SBS), styrene-ethylene/butylene-styrene (SEBS) and of styrene-isoprene-styrene (SIS) systems.

TR dispersions can render their strength and elasticity to bitumen from a physical crosslinking of styrene segments into a three-dimensional network as disclosed by Holden et al. in the Proceedings of International Rubber Conference, 1967 Maclaren. This result can be achieved by the agglomeration of the styrene polymerized block (or polystyrene segments of triblock copolymers), forming very fine domains (down to the nm scale), which provide the physical cross-linkage for a three-dimensional butadiene, ethylene/butylene or isoprene polymerized rubbery matrix. It is known, in all related prior art, that the chemical structure of the styrenic block copolymers which enhances bitumen performance modifier is not related to the chemical structure of the styrenic block copolymers used as a dispersing and/or compatibilizing agent which could promote dispersion and/or stabilization of another separate polymer. Specifically, most of the prior art is focused on processes by means of which the styrenic block copolymers may be compatibilized with bitumen.

SUMMARY OF INVENTION

In accordance with the present invention, homopolymers or copolymers of styrene and styrene derivatives, normally incompatible with bitumen and tending to separate therefrom, can be stably dispersed in bitumen by employing a triblock copolymer which is readily dispersed or dissolved in the bitumen and which comprises an elastomeric copolymer containing styrene which is compatible with bitumen.

Accordingly, in one aspect of the present invention, there is provided a stable bituminous composition, comprising:

a continuous bitumen phase, an elastomeric triblock copolymer comprising polystyrene segments and stabilized and compatibilized in said bituminous phase, and a dispersed particulate polymer phase miscible in the molten state with polystyrene dispersed in said bituminous phase and normally incompatible with said bituminous phase and stabilized against separation from said bituminous phase by said triblock copolymer.

The bitumen-soluble elastomeric copolymer containing a styrene segment serves a dual function, namely (1) effects a uniform dispersion of polystyrene-based rigid polymers normally incompatible with bitumen and (2) provides a styrene domain as a receiving unit for stabilization of the dispersed polystyrene-based rigid polymer against separation from the bitumen with bitumen. The polystyrene domains, which are dispersed throughout the bitumen by reason of the stabilization or compatibilization of the elastomeric triblock copolymer in the bitumen enable the normally-incompatible polystyrene macromolecules to be incorporated into the bitumen by receiving the polystyrene particulates into the domains. The domains in the rubberized bitumen continuous phase become larger once the polystyrene macromolecules are blended in and increase in dimension with increasing levels of dispersed polystyrene.

GENERAL DESCRIPTION OF INVENTION

The term "bitumen" used herein means a class of black or dark-colored (solid, semi-solid or viscous) cementitious substances, natural or manufactured, composed principally of high molecular weight hydrocarbons of which asphalts, tars, pitches and asphaltites are typical. The term "asphalt" used herein means a dark, brown to black, cementitious material, solid or semi-solid in consistency, in which the predominating constituents are bitumens that occur in nature, as such, or are obtained as residue in petroleum refining.

The domain of the elastomeric copolymer of styrene which is readily dispersed or stabilized in the bitumen is provided by an elastomeric triblock copolymer in which the butadiene rubber segments are compatible with or soluble in or are able to be compatibilized with or solubilized in bitumen. Elastomeric triblock copolymers may comprise about 20 to about 80% of terminal styrene blocks, preferably about 24 to about 45%.

Examples of block copolymers which may be employed include styrene-butadiene-styrene triblock copolymers (SBS), styrene-ethylene/butylene-styrene triblock copolymers (SEBS) and styrene-isoprene-styrene block copolymers (SIS). These triblock polymers may be employed for forming stable dispersions of the rigid styrenic polymers in the bitumen.

Elastomeric block copolymers which may be used in the composition of the present invention may have a molecular weight (Mn) of from about 30,000 to about 375,000, preferably about 75,000 to about 275,000.

The rigid styrenic polymers which are stably dispersed in bitumen according to the invention may be polystyrene homopolymers, such as crystal polystyrene and polystyrene foam, or may be grafted copolymers and physical blends/alloys with various rubbers, or may be polymers of styrene derivatives, such as poply(alpha-methylstyrene), poly(p-tert-butylstyrene) and polychlorostyrene. The rigid styrenic polymers also may comprise styrene based rigid copolymers, such as poly(styrene-co-vinylacetate) and poly (styrene-co-vinylthiophene). The styrenic polymers may be natural or recycled polymer, including comingled blends of styrenic polymers.

The SEBS, SBS or SIS triblock copolymers also may be used to disperse and form stable dispersions of other polymers in place of polystyrene, provided that the polymer is miscible with polystyrene in the molten state and hence particulates can be received by the polystyrene domains. One such polymer is polyphenylene oxide (PPO), which is difficult to disperse in bitumen but which is miscible with polystyrene in a molten state at any ratio and may be dispersed and incorporated into the bitumen by the domain effect.

Such styrenic polymers may have a molecular weight of from about 40,000 to about 1,400,000, preferably about 100,000 to about 300,000.

The bitumen-compatible elastomeric triblock copolymer may be provided in any desired amount in the bitumen consistent with the amount of normally non-dispersible polymer to be dispersed and the properties desired to be imparted to the bitumen by the dispersed polymer. Generally, the quantity of elastomeric triblock copolymer dispersed in bitumen may range from about 1 to about 20 wt %, preferably about 3 to about 15 wt %, of the bituminous composition. Generally, the quantity of styrenic polymer dispersed in the bitumen may vary from about 1 to about 35 wt %, preferably about 3 to about 15 wt %, of the bituminous composition.

The stabilized bituminous compositions of the invention show no tendency to phase separate at elevated temperatures in the range of about 100° to about 200° C. and remain stable in the absence of stirring, i.e. the compositions exhibit no tendency for the dispersed particulate phase to separate from the continuous bituminous phase.

The stabilized bituminous compositions of the invention also may be cooled to ambient temperature, may be reheated up to about 160° C. or more up to about 200° C., several times, and may be maintained at such high temperatures for several days, without any tendency to phase separation of the dispersed particulate phase.

The stable dispersions of rigid styrene polymers or other rigid polymer miscible in the molten state with the polystyrene in the continuous bituminous phase may be produced in any convenient manner. The elastomeric triblock copolymer first is uniformly incorporated into the bitumen, usually by dissolving the elastomeric triblock copolymer in the bitumen as to establish very fine polystyrene domains (sized down to the nm scale) and a cross-linked rubbery matrix in the continuous bituminous phase. The polystyrene or other polymer then is added to the composition for dispersion therein, at a temperature of about 150° to about 200° C., preferably about 170° to about 180° C., which may be effected under high shear conditions. As mentioned above, the styrene component of the elastomeric triblock copolymer provides domains which assist first in the dispersion of the styrene polymer in the continuous bituminous phase and then in stabilizing the dispersed styrene polymer against phase separation from the continuous bituminous phase. Alternatively, the elastomeric triblock copolymer and rigid styrene polymer may be blended into the bitumen simultaneously to provide the stable composition.

The stabilized bituminous compositions provided herein may be used as a paving material for all types of paving as well as finding applications in roofing membranes, shingles, waterproofing membranes, sealants, caulks, potting resins and protective finishes. Paving materials generally include aggregate, such as crushed stone pebbles, sand etc., along with the bitumen composition. Similarly, other additives to the bitumen composition are employed, depending on the end use to which the composition of the invention is put. For example, a roofing material may be obtained by the addition of suitable fillers, such as asbestos, carbonates, silicas, wood fibers, mica, sulfates, clays, pigments and/or fire retardants, such as chlorinated waxes. For crack-filler application, an oxide may advantageously be added.

EXAMPLES

A series of experiments was performed to attempt to provide a stable dispersion of molten polystyrene in bitumen.

Eight runs were performed using various polymer systems in two different bitumens (Asphalt 1, Asphalt 2) respectively and a variety of properties was evaluated. The storage stability of the resulting systems was assessed by microscopical observation (magnification 400X) of the morphology of samples after about a 3 hour maintenance of the composition at about 160° C. on a hot stage with a temperature controller. With this approach, the polystyrene dispersibility in bitumen and the its stability at elevated temperature can be followed and determined from the variation in the morphological features with time during the hot staging.

The following Table 1 sets forth the materials used and results obtained for the various runs:

In run 1, polystyrene (4 parts per 100 total parts) alone was dispersed in bitumen using a high shear with a Brinkman Polytron Mixer for 2 hours at about 185° C. Sampling from the mixture while blending indicated that polystyrene was difficult to disperse in the liquid asphalt, even using a high shear due to its intrinsic properties, namely insolubility, rigidity and high melt strength. The resultant coarse dispersion quickly separated from bitumen once agitation stopped, as evidenced by microscopic examination.

In runs 2 and 3, the SBS (4 parts per 100 total parts) alone was dispersed in Asphalt 1 and Asphalt 2 respectively under the same conditions as used in run 1. The SBS was easily dispersed in both sources of asphalt. However, microscopic observation on these two samples at the hot stage showed that the SBS was compatible with Asphalt 1 and not with Asphalt 2 (see Table 1).

In runs 4 and 5, a mixture of polystyrene (4 parts per 100 total parts) and SBS (4 parts per 100 total parts) was dispersed in Asphalt 1 and Asphalt 2 respectively under the same condition as other runs. In comparison between run 4 and run 5, the results of morphological observation of samples indicated that, although the dispersibility of polystyrene was improved significantly for both cases, the polystyrene dispersion became stabilized in the bitumen (Asphalt 1) which contained the solubilized SBS block copolymer providing the polystyrene dispersion with a receiving domain in the bitumen. The dispersed domain increased in dimension with increasing polystyrene concentration.

In the SBS/Asphalt 2/PS system, polystyrene still separated from Asphalt 2 binder because the SBS, which was incompatible to the bitumen, could not provide a stabilized styrene domain in the asphalt medium unless the SBS itself

TABLE 1

| Component | Run No. | | | | | | | |
|---|---|---|---|---|---|---|---|---|
| | 1 | 2 | 3 | 4 | 5 | 6 | 7 | 8 |
| Asphalt 1 | 96 | 96 | 0 | 92 | 0 | 0 | 96 | 92 |
| Asphalt 2 | 0 | 0 | 96 | 0 | 92 | 92 | 0 | 0 |
| Polystyrene | 4 | 0 | 0 | 4 | 4 | 4 | 0 | 4 |
| SBS | 0 | 4 | 4 | 4 | 4 | 4 | 0 | 0 |
| SEBS | 0 | 0 | 0 | 0 | 0 | 0 | 4 | 4 |
| Sulfur | 0 | 0 | 0 | 0 | 0 | 0.15 | 0 | 0 |
| Property | | | | | | | | |
| Penetration at 4° C. | — | 46 | 47 | 41 | — | 43 | — | 42 |
| Penetration at 25° C. | — | 125 | 86 | 105 | — | 73 | — | 110 |
| Softening Point, ° C. | — | 87 | 51 | 89 | 64 | 64 | 44 | 49 |
| Viscosity, cp, 135° C. | — | 788 | 988 | 988 | 1300 | 1250 | 363 | 425 |
| Stability | no* | yes | no | yes | no | yes | yes | yes |

*Could not be dispersed properly into AC

Polystyrene employed in the experiments was a crystal polystyrene plastic in pellet form (PS, melt index: 5 gram/10 min and supplied by Polysar limited) and the two triblock copolymers were styrene-butadiene-styrene (SBS) thermoplastics rubber (Europrene sol T 161 B, 30% bound styrene, 70% bound butadiene, manufactured by Enichem Elastomers America Inc.) and styrene-ethylene/butylene-styrene (SEBS) thermoplastics rubber (Kraton G 1652, 30% bound styrene, 70% bound ethylene/butylene, manufactured by Shell Chemicals Inc.). Two sources of asphalt cements (Asphalt 1 and Asphalt 2) based on the same viscosity grade were employed: Asphalt 1 used for runs 1, 2, 4, 7 and 8 has 167 dmm of penetration at 25° C., 40° C. softening point and 195 cp. of brookfield viscosity at 135° C. and Asphalt 2 used for run 3, 5 and 6 has 148 dmm of penetration at 25° C., 45° C. softening point and 233 cp. of Brookfield viscosity at 135° C.

was compatibilized with the asphalt by other means, for example, using a reactive agent, such as an elemental sulfur (see run 6).

In runs 7 and 8, a mixture of polystyrene (4 parts per 100 total parts) and SEBS substituting for the SBS (4 parts per 100 total parts) was dispersed in Asphalt 1 under the same condition as other runs. The SEBS was compatible with Asphalt 1 and was able to function a dispersion agent and stabilizer to provide a stabilized bituminous composition (see results in Table 1).

SUMMARY OF DISCLOSURE

In summary of this disclosure, the present invention provides a novel system for stably dispersing normally-incompatible styrenic polymers, particularly rigid styrenic polymers, in bitumen by providing dispersed in the bitumen an elastomeric triblock copolymer normally compatible with the bitumen and which is an elastomeric copolymer of styrene. Modifications are possible within the scope of this invention.

What is claimed is:

1. A stable bitmuinous composition, comprising:
   bitumen,
   an elastomeric triblock copolymer comprising polystyrene segments and stabilized and compatibilized in said bitumen, and
   a particulate rigid polymer dispersed in said bitumen, said rigid polymer being miscible in the molten state with polystyrene, said rigid polymer being normally incompatible with said bitumen, said rigid polymer being stabilized against separation from said bitumen by said elastomeric triblock copolymer in said bitumen.

2. The composition of claim 1 wherein said dispersed particulate polymer phase is polystyrene based polymer.

3. The composition of claim 2 wherein said polystyrene-based polymer is a polystyrene homopolymer.

4. The composition of claim 1 wherein said dispersed particulate polymer phase is polyphenylene oxide.

5. The composition of claim 1 wherein said elastomeric triblock copolymer is selected from the group consisting of styrene-butadiene-styrene block copolymers, styrene-ethylene/butylene-styrene block copolymers and styrene-isoprene styrene block copolymers.

6. The composition of claim 5 wherein said dispersed particulate polymer is a polystyrene homopolymer.

7. The composition of claim 1 wherein said elastomeric triblock copolymer is present in said bituminous composition in an amount of about 1 to about 20 wt % of the composition and the quantity of dispersed particulate rigid polymer is present in an amount of about 1 to about 35 wt % of the bituminous composition.

8. The composition of claim 7 wherein said elastomeric triblock copolymer is present in an amount of about 3 to about 15 wt % and said dispersed particulate rigid polymer is present in an amount of about 3 to about 15 wt %.

9. A method of forming a stable bituminous composition, which comprises:
   effecting mixing, in bitumen, of an elastomeric triblock copolymer comprising polystyrene segments and a rigid polymer miscible with polystyrene in the molten state but normally incompatible with bitumen, at a temperature of about 150° C. to about 200° C. to stabilize or compatibilize said elastomeric triblock copolymer in the bitumen and to particulate the polymer and to stabilize the particulated polymer against separation from the bitumen.

10. The method of claim 9 wherein said temperature is about 170° to about 180° C.

* * * * *